Figure 1:
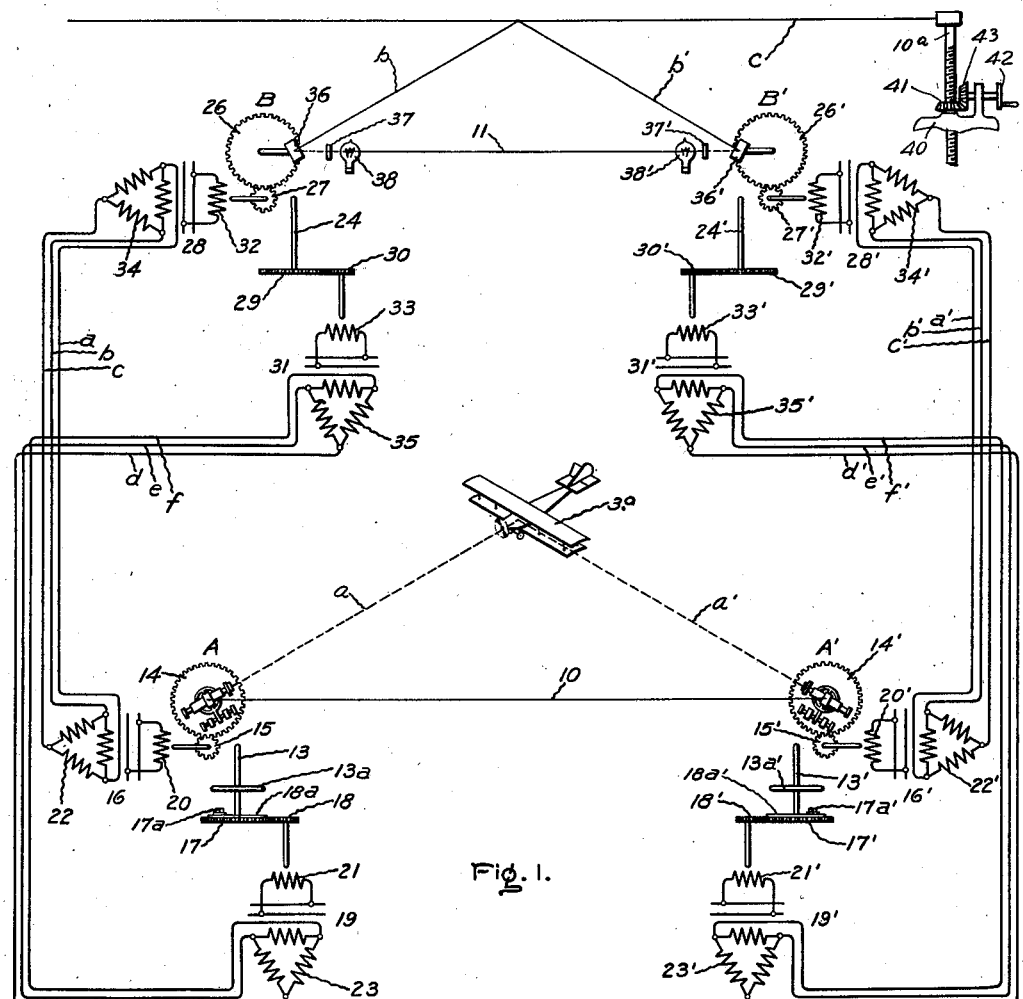

Aug. 25, 1925.

E. M. HEWLETT ET AL

POSITION INDICATOR

Filed Sept. 15, 1921

Inventors:
Edward M. Hewlett,
Waldo W Willard,
by Albert G. Davis
Their Attorney.

Patented Aug. 25, 1925.

1,551,393

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

POSITION INDICATOR.

Application filed September 15, 1921. Serial No. 501,005.

*To all whom it may concern:*

Be it known that we, EDWARD M. HEWLETT and WALDO W. WILLARD, citizens of the United States, residing at Schenectady, in the county of Schenectady, State of New York, have invented certain new and useful Improvements in Position Indicators, of which the following is a specification.

This invention relates to position indicators and has for its object the provision of a method of and means whereby the position in space of an object visible from two remote points can be determined.

More specifically, this invention relates to a system of automatic triangulation whereby observations of an aerial object, such as an aeroplane, can be taken from two known points on the ground and the lines of sight reproduced in a convenient receiving station to scale with relation to a chart so as to indicate the position of the object both in altitude and azimuth.

In carrying out our invention, we employ two sighting devices located on a base line at a known distance from each other. At a receiving station located at some convenient place are two receiving devices each provided with a source of light and a reflecting prism for throwing a beam of light on a chart of the field of observation. The receiving devices are positioned on a base line which may be parallel to the base line of the sighting devices, the chart and the receiving station base line being to scale. Angular movements of the sighting devices in both azimuth and altitude are transmitted to the respective receiving devices by means of self-synchronous systems, now known as selsyn systems, so that the beams of light reflected by the receiving devices are automatically directed parallel with the lines of sight of the sighting devices, respectively. The chart is held in a horizontal plane over the receiving station base line and is adjustable to bring the point of intersection of the beams of light on the chart. This spot of light indicates on the chart the position in azimuth of the object sighted upon, and the distance between the chart and the receiving station base line represents the height of the object.

In one of its aspects, our invention is particularly applicable to the control of gun fire upon an invisible target. In such a case the sighting devices may be located in convenient positions of observation, such as in a trench, while the receiving devices are located convenient to the gun. The gun may be some distance in the rear in a concealed position from which the target cannot be observed. From the information in regard to the height and direction of the target transmitted from the points of observation and reproduced by the receiving devices, the gun can be properly directed on the target.

Figure 3:
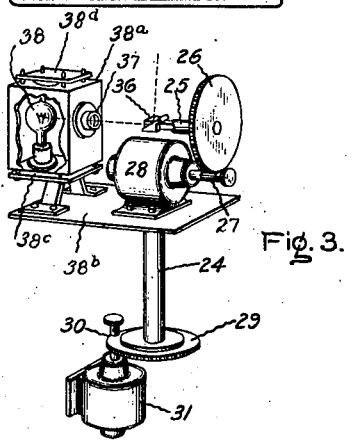
Figure 2:
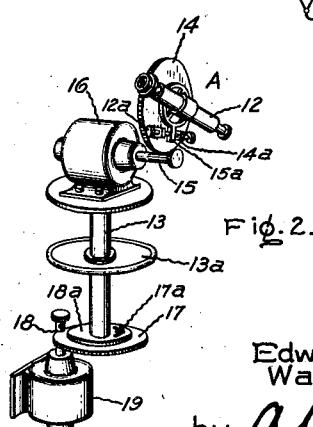

For a more complete understanding of our invention reference should be had to the accompanying drawing in which Fig. 1 is a diagrammatic view of a position indicator embodying our invention. Fig. 2 is a simplified perspective view of the sighting device; while Fig. 3 is a simplified perspective view of the receiving device.

Referring to Fig. 1 of the drawing, the sighting devices A and A' are located a convenient distance apart, such as a mile, on a known base line 10. In a convenient receiving station, such as a dugout, which may be remote from the sighting devices, are located two receiving instruments B and B' having a base line 11 parallel with base line 10 and of a length to scale therewith, such as 5.28 feet.

A chart C of the field of observation covered by the sighting devices is held by vertical supporting rod or bracket 10ª in a horizontal plane above the base line 11. The chart is adjustable vertically to any desired height with respect to base line 11, but it is maintained in such position horizontally that the projection of base line 11 and the representation of base line 10 thereon are coincident. The chart is drawn to the same scale as base line 11.

Referring to Fig. 2, the sighting device A consists of a telescope 12 which is supported on a spindle 13 so as to be movable about a horizontal axis perpendicular to the line of sight of the telescope, this axis being the axis of a spur gear 14 adjustably attached thereto. The telescope may be adjusted about its horizontal axis with relation to gear 14 by adjusting screws 12ª carried in lugs 14ª on the gear and engaging opposite sides of an arm 15ª secured to the telescope.

The telescope is rotatable with the spindle 13 about the axis of the spindle, which is maintained vertical, by means of a hand wheel 13ª. Spur gear 14 meshes with a pinion 15 on the shaft of a selsyn generator 16. A spur gear 17 is adjustably secured to spindle 13 by means of a screw 17ª which extends through an arc-shaped slot in a flange 18ª on the spindle. Meshing with the gear 17 is a pinion 18 on the shaft of a selsyn generator 19. Selsyn generators 16 and 19 may be identical in construction, having single phase rotor windings 20 and 21 and three phase stator windings 22 and 23 (see Fig. 1).

Referring to Fig. 3 of the drawing, the receiving instrument B consists of a reflecting prism 36 which is mounted on a spindle 24 so as to be movable about the axis, which is maintained horizontal, of a shaft 25 to which the prism is secured. A collimated beam of light is projected on the prism through lens 37 from a source of light 38. The lens 37 and source of light 38 are held in fixed relation to the prism. As shown, the source of light 38 consists of an incandescent lamp which is mounted in a box 38ª secured to a base or platform 38ᵇ carried by the spindle 24. The lens 37 is mounted in a suitable aperture in the box through which the light is directed on the prism. To provide ventilation for the lamp a false bottom 38ᶜ and top 38ᵈ are provided for the box secured in spaced relation therewith by means of suitable bolts. This arrangement also provides for access to the interior of the box in case it is desired to renew the lamp. The prism is also rotatable with the spindle 24 about the axis of the spindle, which is maintained vertical. The point of reflection of the prism is coincident with the intersection of the horizontal and vertical axis of the prism. Secured to shaft 25 is a spur gear 26 which meshes with a pinion 27 on the shaft of a selsyn driving motor 28. The spindle 24 is rotated about its vertical axis by means of a gear 29 secured thereto and meshing with a pinion 30 on the shaft of a selsyn driving motor 31. Selsyn motors 28 and 31 may be identical in construction with selsyn generators 16 and 19, having single phase rotor windings 32 and 33 and three phase stator windings 34 and 35 (see Fig. 1).

Like points of the stator windings 22 and 34 are interconnected by conductors $a$, $b$, and $c$, while like points of stator windings 23 and 35 are interconnected by conductors $d$, $e$, and $f$. The rotor windings 20, 21, 32, and 33 are energized from a suitable source of alternating current. The operation of systems of this general character in the transmission of angular movement is well known in the art. When the rotors of an interconnected generator and motor are in the same angular relation with respect to their stators, the voltages induced in the respective interconnected stator windings by the cooperating field windings are equal and opposite. If the rotor of the generator is turned through an angle and held in its new position, the voltages no longer counterbalance, whereby equalizing currents are caused to flow in the armature windings. The equalizing currents exert a torque on the rotor of the motor causing it to again take up a position corresponding to the position of the generator rotor. The movements of the telescope 12 applied to generators 16 and 19 are thus transmitted to the receiving device through motors 28 and 31. The ratio between gears 14 and 15 is equal to the ratio between gears 26 and 27, and likewise the ratio between gears 17 and 18 is equal to the ratio between gears 29 and 30, so that the angular movement imparted to the receiving device by the selsyn motors is equal to the angular movement of the telescope.

The sighting device A' and receiving device B' are identical in construction with sighting device A and receiving device B, and hence will not be described in detail. Like parts of these devices are indicated by prime reference numerals for the purpose of a clearer understanding.

The telescopes A and A' are initially adjusted in altitude with relation to gears 14 and 14' by means of screws 12ª and 12ª' and in azimuth with relation to gears 17 and 17' by loosening screws 17ª and 17ª' and turning spindles 13 and 13' so that the lines of sight of the telescope are parallel respectively with the beams of light reflected by the receiving devices. The horizontal and vertical axes of the respective telescopes intersect at points which are the limits of base line 10. The limits of base line 11 are the points of reflection of the prisms.

Assuming that it is desired to determine the position of an object in the air, such as an aeroplane 39 which is within the field of observation of both sighting devices, the operation of our invention is as follows: The telescopes on the sighting devices are directed at the aeroplane by rotating them about their horizontal and vertical axes. It will be observed that the lines of sight $a$ and $a'$ of the sighting devices intersect at the aeroplane. The beams of light $b$ and $b'$ are automatically moved by the selsyn motors to maintain their parallel relation with the lines of sight $a$ and $a'$, respectively. The intersection of the beams of light, therefore, represents the position in space of the aeroplane, with reference to base line 11; and this position is determined by moving chart C upward or downward until the point of intersection of the beams of light falls thereon at some point which indicates the position in azimuth of the aeroplane. To facilitate the vertical adjustment of the chart the support 10ª may be threaded and slidably secured in a supporting base 40, but splined or otherwise secured against rotation with respect to the base so that the projection of the miniature base line 11 on the chart always falls on the representation of base line 10 on the chart. The support 10ª may be upheld on the base 40 by means of a bevel gear 41 in screw threaded engagement therewith, and it may be raised and lowered to adjust the chart by means of a handwheel 42 turning a gear 43 cooperating with gear 41. To find the height of the aeroplane, it is only necessary to find the distance to scale from the chart to the base line 11, since the triangle formed by beams of light $b$, $b'$, and base line 11 is similar to the triangle formed by lines of sight $a$, $a'$, and base line 10. It will be observed that this distance is the distance from the chart to the points of reflection of the beams of light.

The base line 11 has been taken parallel to base line 10 for the purpose of illustration, although the base lines need not necessarily be parallel. The projection of base line 11 on the chart, however, must be coincident with the representation of base line 10 on the chart.

Obviously, the selsyn motors may be used to drive indicators, and the prisms adjusted by manual or other means to the positions indicated. Various methods may be used to determine the position of the intersection of the beams of light.

It will be observed that the length of base line 10 varies slightly with the position of the telescopes due to the fact that the axes of collimation of the telescopes do not exactly intersect the vertical axes of the supports. This variation of the length of base line 10 is not so great as to cause an appreciable error, however.

Although we have shown and described selsyn systems for the transmission of the angular movements of the sighting devices to the receiving devices, obviously any suitable synchronous system for the transmission of angular movement can be used.

In accordance with the provisions of the patent statutes, we have described the principle of operation of our invention, together with the apparatus which we now consider to represent the best embodiment thereof, but we desire to have it understood that the apparatus shown is only illustrative and that the invention can be carried out by other means.

What we claim as new and desire to secure by Letters Patent of the United States, is:—

1. The method of finding the position of an aerial object in terms of latitude, longitude and height which consists in automatically controlling the direction of a plurality of beams of light so that said beams reproduce with relation to a chart of the field of observation lines of sight to the object from two remote observation points, whereby the point of intersection of the beams represents the position in space of the object with reference to the chart, adjusting the chart in a direction corresponding to the vertical while maintaining its original orientation until the point of intersection of the beams falls thereon and indicates the position of the object in latitude and longitude, and then finding the perpendicular distance to scale from the chart to the point of origin of one of said beams to determine the height of the object.

2. A position indicator for aerial objects comprising a plurality of sighting devices, a plurality of beams of light controlled thereby in directions to represent the lines of sight of said sighting devices so that when said sighting devices are directed at an aerial object said beams of light are caused to intersect at a point representing the position in space of the object, and a chart of the field of observation of said sighting devices adjustable in a direction corresponding to the vertical to cause said point of intersection to fall thereon and indicate the position of the object in latitude and longitude, the distance from the chart to the origin of one of said beams of light representing the height of said object.

3. A position indicator for aerial objects comprising a plurality of sighting devices, a plurality of controlled devices remote therefrom for projecting beams of light, systems for the transmission of angular movements associated with said sighting devices and said controlled devices, whereby the beams of light are caused to represent the lines of sight of said sighting devices so that when said sighting devices are directed at an aerial object, said beams of light are caused to intersect at a point representing the position in space of the object, and a chart of the field of observation adjustable vertically with respect to the controlled devices to cause the point of intersection of the beams of light to fall thereon and thereby indicate the position in latitude and longitude of the object, the distance from the chart to the points of projection of the beams of light representing to scale the height of the object.

In witness whereof, we have hereunto set our hands this 14th day of September, 1921.

EDWARD M. HEWLETT.
WALDO W. WILLARD.